US010831558B1

United States Patent
Ozerkov et al.

(10) Patent No.: US 10,831,558 B1
(45) Date of Patent: Nov. 10, 2020

(54) SINGLE-CLICK EJECTION OF PERIPHERAL DEVICES ASSOCIATED WITH VIRTUAL MACHINES

(71) Applicant: Parallels International GmbH, Schaffhausen (CH)

(72) Inventors: Konstantin Ozerkov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 90 days.

(21) Appl. No.: 16/295,348

(22) Filed: Mar. 7, 2019

Related U.S. Application Data

(63) Continuation of application No. 15/695,558, filed on Sep. 5, 2017, now Pat. No. 10,282,235.

(51) Int. Cl.
  *G06F 9/50* (2006.01)
  *G06F 9/455* (2018.01)
  *G06F 13/24* (2006.01)

(52) U.S. Cl.
  CPC ........ *G06F 9/5077* (2013.01); *G06F 9/45558* (2013.01); *G06F 13/24* (2013.01); *G06F 2009/45579* (2013.01)

(58) Field of Classification Search
  CPC .................................................. G06F 9/5077
  See application file for complete search history.

(56) References Cited

U.S. PATENT DOCUMENTS

| | | | | |
|---|---|---|---|---|
| 5,787,246 | A | * | 7/1998 | Lichtman ............... G06F 15/177 709/220 |
| 8,429,322 | B2 | | 4/2013 | Tsirkin |
| 2002/0138698 | A1 | | 9/2002 | Kalla |
| 2006/0005189 | A1 | * | 1/2006 | Vega ..................... G06F 9/4856 718/1 |
| 2017/0046187 | A1 | * | 2/2017 | Tsirkin ................ G06F 9/45558 |

OTHER PUBLICATIONS

"Registering for Device Notification", https://msdn.microsoftcom/en-us/library/windows/desktop/aa363432(v=vs.85).aspx, May 31, 2018, 15 pages.
"Processing a Request to Remove a Device", https://msdn.microsoftcom/en-us/library/windows/desktop/aa363427v=vs.85).aspx, May 31, 2018, 5 pages.
USPTO, Notice of Allowance for Application No. 158695,558, dated Dec. 20, 2018.

* cited by examiner

*Primary Examiner* — Charlie Sun
(74) *Attorney, Agent, or Firm* — Rosenberg, Klein & Lee

(57) ABSTRACT

Systems and methods for implementing single-click ejection of a mountable device associated with a virtual machine. An example method comprises: receiving, by a guest agent running on a virtual machine managed by a virtual machine manager (VMM) of a host computer system, a device removal request from the VMM, the device removal request identifying a peripheral device to be unmounted by the virtual machine; causing, by the guest agent, a guest operating system (OS) of the virtual machine to unmount the peripheral device; receiving, by the guest agent, a notification of completion of a device unmounting operation performed by the virtual machine with respect to the peripheral device; and transmitting, by the guest agent to the VMM, an operation completion status identified by the notification.

20 Claims, 6 Drawing Sheets

SINGLE-CLICK EJECTION OF PERIPHERAL DEVICES ASSOCIATED WITH VIRTUAL MACHINES

RELATED APPLICATIONS

This application is a continuation of U.S. patent application Ser. No. 15/695,558 filed on Sep. 5, 2017, entitled "Single-Click Ejection of Peripheral Devices Associated with Virtual Machines," the entire content of which is incorporated by reference herein.

TECHNICAL FIELD

The present disclosure is generally related to virtualized computer systems, and is specifically related to systems and methods for managing peripheral devices associated with virtual machine.

BACKGROUND

Virtualization may be viewed as abstraction of hardware components into logical objects in order to allow a computer system to execute various software modules, for example, multiple operating systems, concurrently and in isolation from other software modules. Virtualization may be achieved by running a software layer, often referred to as a "virtual machine monitor" or "hypervisor," above the hardware and below the virtual machines. A hypervisor may abstract the physical layer and present this abstraction to virtual machines to use, by providing interfaces between the underlying hardware and virtual devices of virtual machines. For example, processor virtualization may be implemented by the hypervisor scheduling time slots on one or more physical processors for a virtual machine, rather than a virtual machine actually having a dedicated physical processor.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
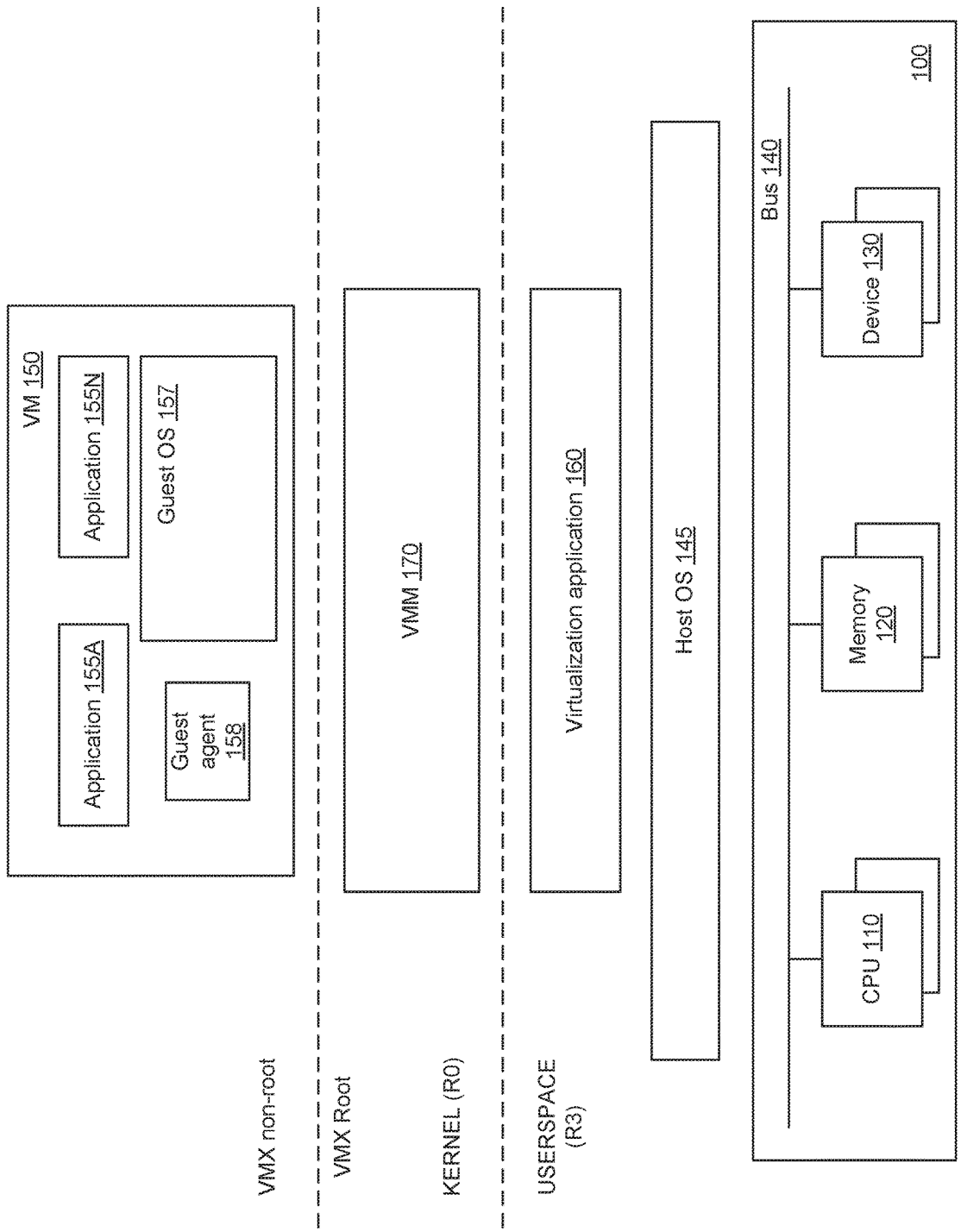
FIG. 1 depicts a high-level diagram of an example virtualized execution environment operating in accordance with one or more aspects of the present disclosure.

Described herein are systems and methods for single-click ejection of peripheral devices associated with virtual machines. Examples of peripheral devices include storage devices (such as flash memory cards, flash memory sticks, compact disks, hard disk drives (HDDs) or solid state drives (SSDs)), input/output (I/O) devices, and various other devices.

A virtual execution environment implemented by a host computer system may comprise a virtual machine monitor (VMM) facilitating execution of one or more virtual machines, each of which may run a guest operating system (OS) to manage one or more guest applications. The VMM may be running at an elevated privilege level to emulate the underlying hardware platform (e.g., the x86 platform), including emulating the processor, memory, and peripheral devices (such as network interface controllers, hard disk controllers, flash memory cards and sticks, compact disks, etc.). In certain implementations, virtual machine management functions (such as virtual machine creation, execution, and termination) may be performed by a virtualization application running in a non-privileged execution mode in the user space of the host.

In an illustrative example, a virtual execution environment may be employed for executing the software that was originally developed for a platform that is different from the native platform of the host computer system. Certain mountable peripheral devices (such as flash memory cards and sticks, compact disks, hard disk drives (HDDs) or solid state drives (SSDs), etc.) may be exclusively or non-exclusively associated with a virtual machine managed by the VMM. A virtual machine user may wish to eject (i.e., unmount) a peripheral device and physically remove the peripheral device from the host computer system. In order to prevent the data loss by the virtual machine and/or the host computer system, physical removal of the peripheral device from the host computer system should be preceded by unmounting the peripheral device within the guest OS, disassociating the peripheral device from the virtual machine by the VMM, and unmounting the peripheral device from the host OS. In conventional systems, most if not all the above-listed operations would need to be manually initiated via the appropriate graphical user interface (GUI) controls, which burdens the user while making the operation prone to user's errors. Failure to initiate one or more of the above-listed operations may lead to the data loss. For example, the user's omitting the first step of ejecting the peripheral device within the guest OS and instead starting with disassociating the peripheral device from the virtual machine by the VMM may prevent the guest OS from completing a pending write operation with respect to the peripheral device. The present disclosure addresses the above-noted deficiencies of common implementations and thus improves the functionality and efficiency of virtualization environments implemented by general purpose or specialized computing devices, by employing a software agent operating within the guest OS to notify the VMM of the device unmounting operation that has been initiated within the guest OS and/or to cause the guest OS to unmount a peripheral device responsive to receiving a device removal request from the VMM, as described in more detail herein below.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 depicts a high-level diagram of an example virtualized execution environment operating in accordance with one or more aspects of the present disclosure. The host computer system 100 may include one or more central processing units (CPU) 110, also referred to as "processors" herein, communicatively coupled to one or more memory devices 120 and one or more peripheral devices 130 via a system bus 140.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module. A processor may also be referred to as a central processing unit (CPU). "Memory device" herein refers to a volatile or non-volatile memory, such as RAM, ROM, EEPROM, or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices. Certain peripheral devices, such as flash memory cards, compact disks, HDDs, or SSDs, may be hot-pluggable to the host computer system. Insertion of such a peripheral device into a suitable interface (e.g., a Universal Serial Bus (USB) socket) of the host computer system may trigger mounting the peripheral device by the host operating system (OS) 145. Mounting the peripheral device may involve identifying the device type, installing and/or activating an appropriate device driver, and initializing the peripheral device by the host OS via the device driver.

The computer system 100 may implement a virtual execution environment for executing the software developed for a platform that is different from the native platform of the host computer system 100. In certain implementations, the virtual execution environment may be implemented using certain hardware-assisted virtualization features of the processor 110, which may support executing, at an elevated privilege level, a VMM 170 that manages one or more virtual machines. In various implementations, the VMM 170 may be implemented as a kernel module, a kernel extension, a driver, or a part of the host operating system (OS) 145.

The VMM 170 may present a virtual machine 150 with an abstraction of one or more virtual processors, while retaining selective control of processor resources, physical memory, interrupt management, and input/output (I/O). A virtual machine 150 may implement a software environment which may be represented by a stack including a guest operating system (OS) 157 and one or more applications 155A-155N. Each virtual machine 150 may operate independently of other virtual machines and use the VMM-facilitated interface to the processors, memory, storage, graphics, and I/O provided by the host platform 100.

A transition from the VMM execution mode (also referred to as VMX root operation in certain processor architectures) to the guest execution mode (also referred to as VMX non-root operation) is referred to as a VM entry and may be performed by invoking a special Instruction Set Architecture (ISA)-dependent instruction (e.g., VMLAUNCH/VMRESUME or VMRUN instructions). The reverse transition, i.e., transition from the guest execution mode to the VMM execution mode is referred to as a VM exit and is initiated by the processor in response to detecting one of the triggering events (such as an attempt to execute a certain privileged instruction or to access a certain memory address). Thus, when executed in the guest execution mode, certain instructions and events, instead of their ordinary operation, cause VM exits to the VMM 170. Because these VM exits modify the virtual processor's ordinary behavior, the functionality of software in the guest execution mode is limited by certain pre-configured restrictions for the code being executed. It is this very limitation that allows the VMM to retain the full control of processor resources and prevent the virtual machine from executing an operation that would corrupt the host state. Because the guest execution mode places restrictions even on software running on the virtual processor with the current privilege level (CPL) of zero, the guest software may run at the privilege level for which it was originally designed.

In the absence of hardware-assisted virtualization support by the processor 110, binary translation may be implemented for translating instructions to be executed by the virtual machine 150 to the instruction set supported by the processor 110 and/or for shifting the execution privilege levels in the guest execution mode.

In certain implementations, various virtual machine management functions (such as virtual machine creation, execution, and termination) may be performed by the virtualization application 160 running in a non-privileged execution mode in the user space of the host computer system 100. The virtualization application 160 may include a separate processing thread for each virtual processor (VCPU) of the virtual machine(s) 150. Within each thread, the virtualization application 160 may invoke the functions of the VMM 170 for performing the platform emulation or getting access to the run-time data of the virtual machine(s) 150. In certain implementations, the virtualization application 160 may further implement a GUI intercepting user input and displaying graphical output generated by the virtual machine.

Certain instructions executed and/or certain events occurring in the guest execution mode may cause VM exits, which are processed by the VMM 170, which may pass the VM exit reason and other relevant information to the virtualization application 160, which thus exercises control over the execution of the virtual machine 150.

Each of the host OS 145, VMM 170, and guest OS 157 may provide appropriate GUI controls for initiating the peripheral device unmount operation. For example, a USB device eject icon may appear in the Windows® system tray or MacOS® menu bar. Upon detecting a mouse click event associated with the device eject icon, the OS may attempt to complete all pending I/O operations with respect to the peripheral device being ejected and unmount the peripheral device. Upon successfully unmounting the device, the OS may notify the user that the device may be safely removed. A GUI associated with the VMM 170 and/or virtualization application 160 may include a functionally similar GUI control for disassociating a peripheral device from a virtual machine.

As noted herein above, physical removal of a peripheral device (e.g., a flash memory card, a hard disk drive (HDD), or a solid state drive (SSD)) from the host computer system 100 should be preceded by unmounting the peripheral device within the guest OS 157, disassociating the peripheral device from the virtual machine 150 by the VMM 170, and unmounting the peripheral device from the host OS 145. In accordance with one or more aspects of the present disclosure, a guest software agent 158 executed under the guest OS 157, may be employed for facilitating certain interactions of the guest OS 157 with the host computer system 100, e.g., interactions associated with peripheral device unmounting.

Figure 2:
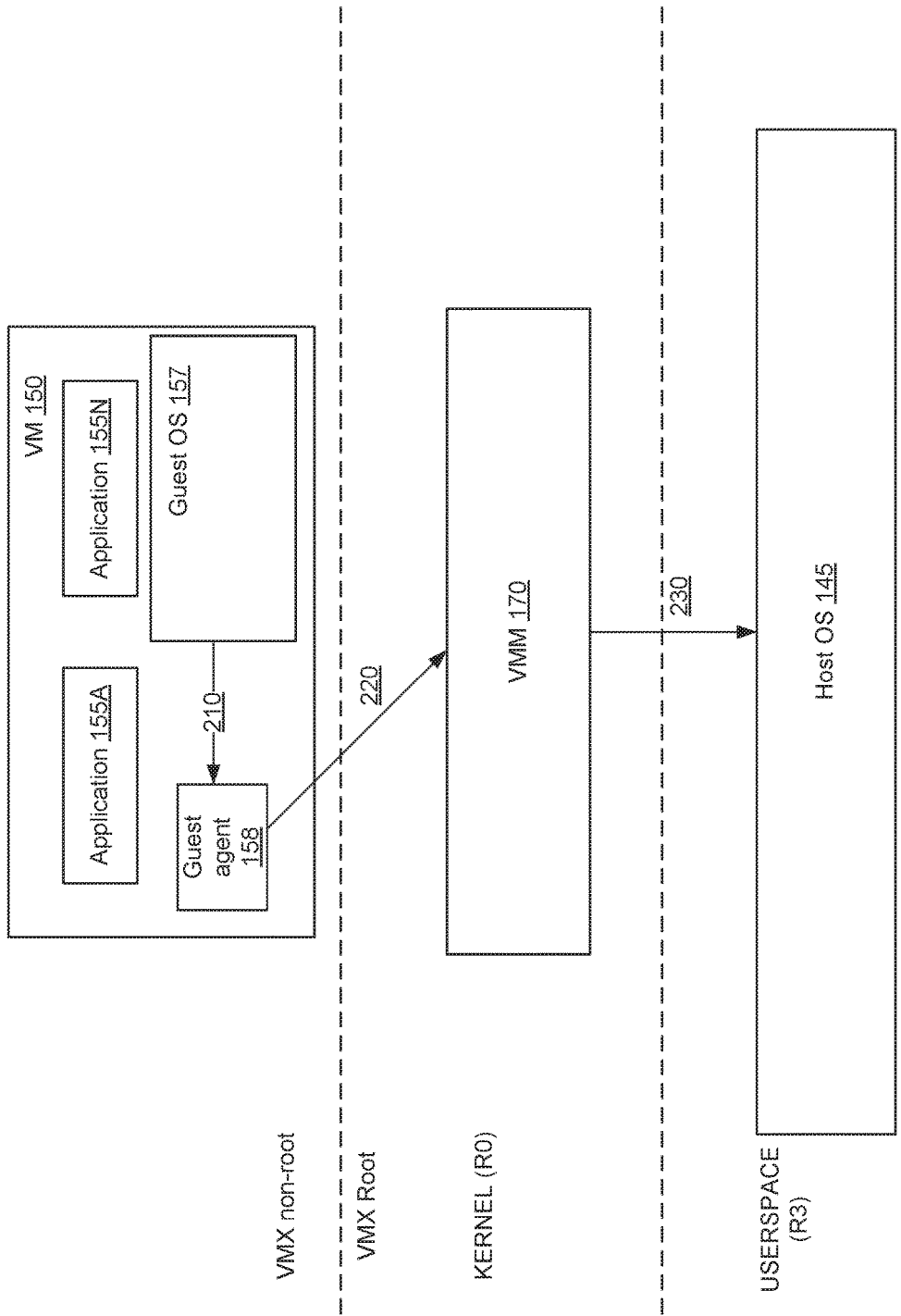
FIGS. 2-3 depict example interaction diagrams illustrating sequences of interactions of components of the virtualized execution environment for managing mountable devices associated with virtual machine, in accordance with one or more aspects of the present disclosure.

In an illustrative example, the guest agent 158 may be employed to notify the VMM 170 of a peripheral device unmounting operation that has been initiated within the guest OS 157, as schematically illustrated by FIG. 2. The example interaction diagram of FIG. 2 illustrates an example sequence of interactions of components of the virtualized execution environment for managing mountable devices associated with virtual machine, in accordance with one or more aspects of the present disclosure.

Upon initialization, the guest agent 158 may register with the guest OS 157 for receiving certain device status notifications, such as device removal requests and/or device removal notifications. In an illustrative example, the guest agent 158 may execute the Windows® API call RegisterDeviceNotification in order to receive status notifications (e.g., WM_DEVICECHANGE, DBT_DEVICEQUERYREMOVE, DBT_DEVICEREMOVEPENDING, and/or DBT_DEVICEREMOVECOMPLETE device events) associated with device types that are specified by the parameters of the RegisterDeviceNotification call. Alternatively, the guest agent 158 may employ other techniques for receiving peripheral device status notifications, e.g., installing a custom filtering driver associated with storage class driver to intercept certain device-specific events.

Responsive to receiving, from the guest OS 157, a notification 210 of a device removal request, the guest agent 158 may transmit a notification 220 to notify the VMM 170 that the identified peripheral device has been unmounted by the guest OS. The notification 220 may include an identifier of the virtual peripheral device and an identifier of the device status (e.g., device removal pending or device removal complete).

Responsive to receiving the notification 220, the VMM 170 may disassociate the device from the virtual machine and transmit a notification 230 to the host OS 145. The notification 230 may include an identifier of the physical peripheral device corresponding to the ejected virtual peripheral device and may further comprise an identifier of the device status (e.g., device removal pending or device removal complete). In certain implementations, if two or more virtual machines are managed by the VMM 170, the VMM 170 may only send the notification 230 to the host OS 145 responsive to ascertaining that the peripheral device the physical peripheral device corresponding to the ejected virtual peripheral device is not used by other virtual machines.

Figure 3:
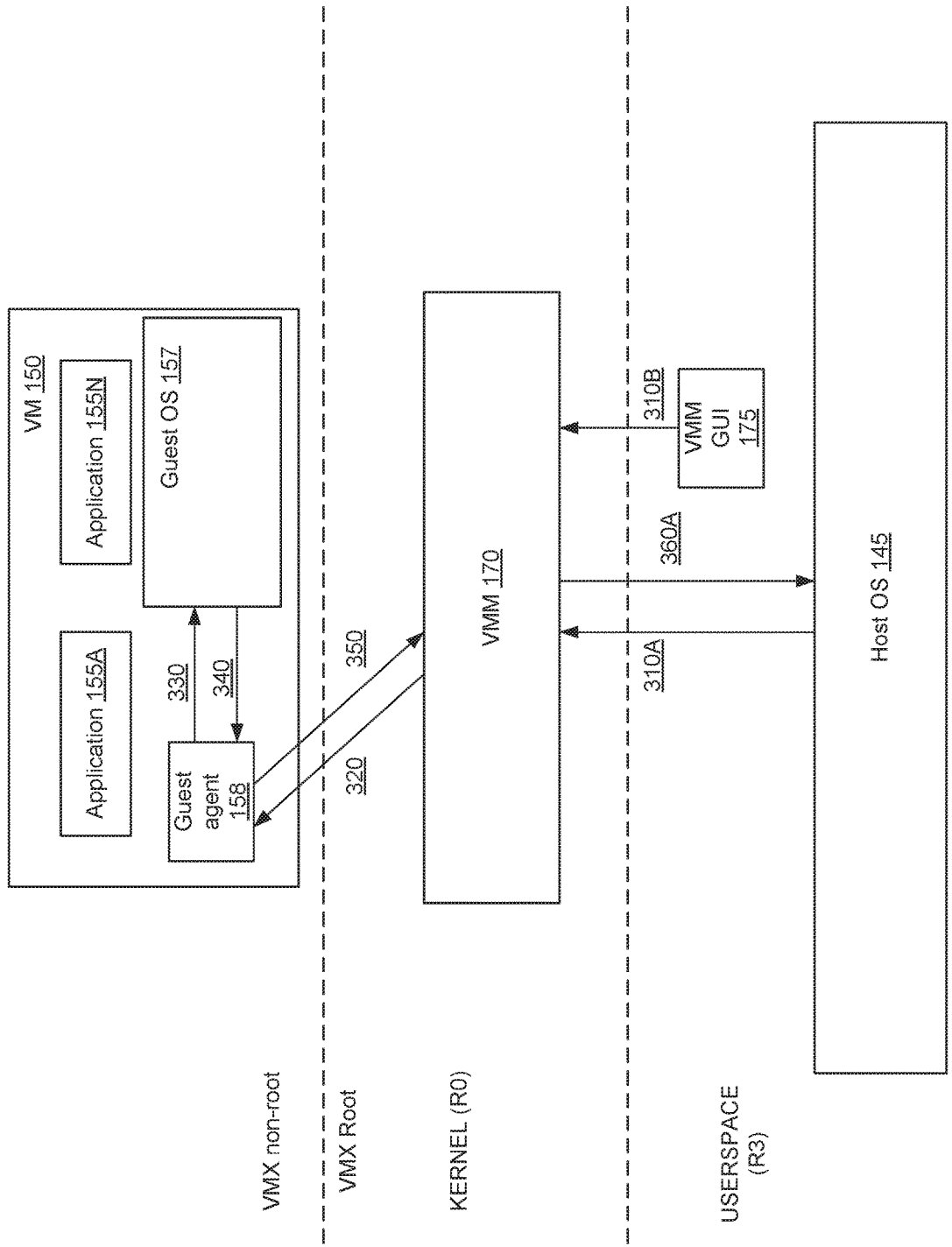

In another illustrative example, the guest agent 158 may be employed to cause the guest OS 157 to unmount a peripheral device responsive to receiving a device removal request from the VMM, as schematically illustrated by FIG. 3. The example interaction diagram of FIG. 3 illustrates another example the sequence of interactions of components of the virtualized execution environment for managing mountable devices associated with virtual machine, in accordance with one or more aspects of the present disclosure.

The VMM 170 may receive a device removal request initiated by the user via the GUI 175 associated with the VMM 170; alternatively, the VMM 170 may receive a notification of a device removal request received by the host OS 145. The VMM 170 may register with the host OS 145 for receiving certain device status notifications, such as device removal requests and/or device removal notifications. In an illustrative example, the VMM 170 may execute the RegisterDeviceNotification Windows® API call in order to receive status notifications (e.g., DBT_DEVICEQUERYREMOVE device events) associated with device types that are specified by the parameters of the RegisterDeviceNotification call. Alternatively, the VMM 170 may employ other techniques for receiving peripheral device status notifications, e.g., installing a custom filtering driver associated with storage class driver to intercept certain device-specific events.

Responsive to receiving, from the host OS 145 or from a VMM GUI, a device removal request 310A-310B, the VMM 170 may transmit a device removal request 320 to the guest agent 158. The device removal request 320 may be initiated by the host OS 145 or by a GUI control of the VMM 170 and may include an identifier of the virtual peripheral device and an identifier of the device status (e.g., device removal requested).

Responsive to receiving the device removal request 320, the guest agent 158 may cause the guest OS 157 to unmount the peripheral device identified by the device removal request 320. In an illustrative example, the guest agent 158 may execute the CM_Request_Device_Eject Windows® API call 330 identifying the peripheral device to be ejected. Responsive to receiving an indication 340 of a completion of the requested device ejection operation from the guest OS 157, the guest agent 158 may transmit, to the VMM 170, a device removal response 350 comprising an error code indicating whether the requested device removal operation has completed successfully. Responsive to receiving the device removal response 350, the VMM 170 may analyze the error code. Responsive to determining that the device removal operation has completed successfully, the VMM 170 may cause the host OS 145 to unmount the peripheral device identified by the device removal request 320. In an illustrative example, the VMM 170 may execute the CM_Request_Device_Eject Windows® API call 360 identifying the peripheral device to be ejected. Responsive to determining that the requested device removal operation 330 has terminated abnormally, the VMM 170 may cause the GUI 175 to display a notification informing the user of the abnormal termination of the requested device removal operation.

Figure 4:
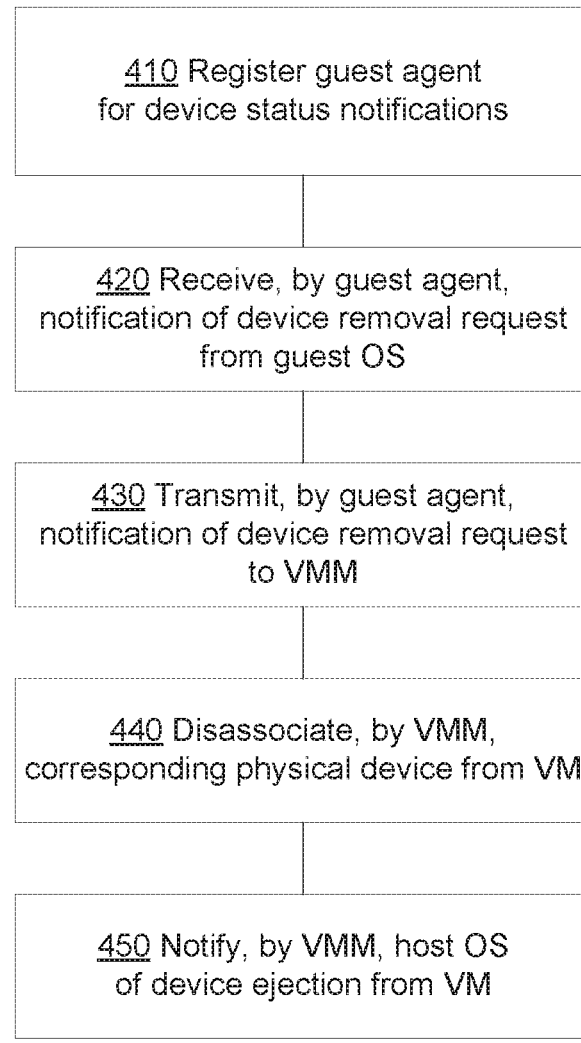
FIGS. 4-5 depict flow diagrams of example methods of single-click ejection of a mountable device associated with a virtual machine, in accordance with one or more aspects of the present disclosure.

FIG. 4 depicts a flow diagram of one illustrative example of method 400 of single-click ejection of a mountable device associated with a virtual machine, in accordance with one or more aspects of the present disclosure. Method 400 employs the guest agent 158 to notify the VMM 170 of a peripheral device unmounting operation that has been initiated within the guest OS 157, as described herein above with reference to FIG. 2. In an illustrative example, the guest agent is provided by a software module running in the user space of the guest OS.

Method 400 and/or each of its individual functions, routines, subroutines, or operations may be performed by one or more processors of the computer system (e.g., computer system 100 of FIG. 1) implementing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, the guest agent may be registered with the guest OS for peripheral device status notifications, as described in more detail herein above.

At block 420, the guest agent may receive, from the guest OS, a device removal request identifying a virtual peripheral device unmounted by the virtual machine. In various illustrative examples, the peripheral device may be provided, e.g., by a flash memory card, a compact disk, a hard disk drive (HDD) or a solid state drive (SSD), as described in more detail herein above.

At block 430, the guest agent may transmit, to the VMM, a notification of the device removal request, as described in more detail herein above.

Responsive to receiving the notification, the VMM may, at block 440, disassociate from the virtual machine the physical device corresponding to the virtual peripheral device, as described in more detail herein above.

At block 450, the VMM may notify the host OS of disassociating the physical device from the virtual machine. The VMM may further cause the host OS to unmount and eject the peripheral device, and the method may terminate.

Figure 5:
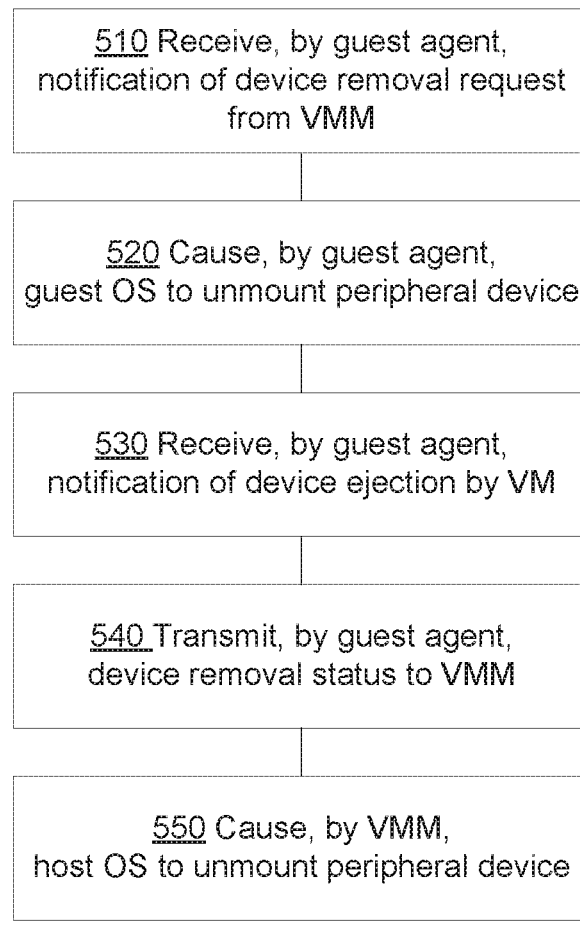

FIG. 5 depicts a flow diagram of one illustrative example of method 500 of single-click ejection of a mountable device associated with a virtual machine, in accordance with one or more aspects of the present disclosure. Method 500 employs the guest agent 158 to cause the guest OS 157 to unmount a peripheral device responsive to receiving a device removal request from the VMM, as described herein above with reference to FIG. 3. In an illustrative example, the guest agent is provided by a software module running in the user space of the guest OS.

Method 500 and/or each of its individual functions, routines, subroutines, or operations may be performed by one or more processors of the computer system (e.g., computer system 100 of FIG. 1) implementing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

At block 510, the guest agent may receive, from the VMM, a device removal request identifying a peripheral device to be unmounted by the virtual machine. In an illustrative example, the device removal request may be initiated by the user via the GUI associated with the VMM. In another illustrative example, the device removal request may be initiated by the user via the GUI associated with the host OS, as described in more detail herein above.

At block 520, the guest agent may cause the guest OS to unmount the identified peripheral device. In an illustrative example, the guest agent may execute the CM_Request_Device_Eject Windows® API call identifying the peripheral device to be ejected, as described in more detail herein above.

At block 530, the guest agent may receive a notification of completion of the device unmounting operation performed by the virtual machine with respect to the peripheral device, as described in more detail herein above.

At block 540, the guest agent may transmit, to the VMM, the operation completion status identified by the notification, as described in more detail herein above.

At block 550, the VMM may cause the host OS to eject the peripheral device, and the method may terminate.

Figure 6:
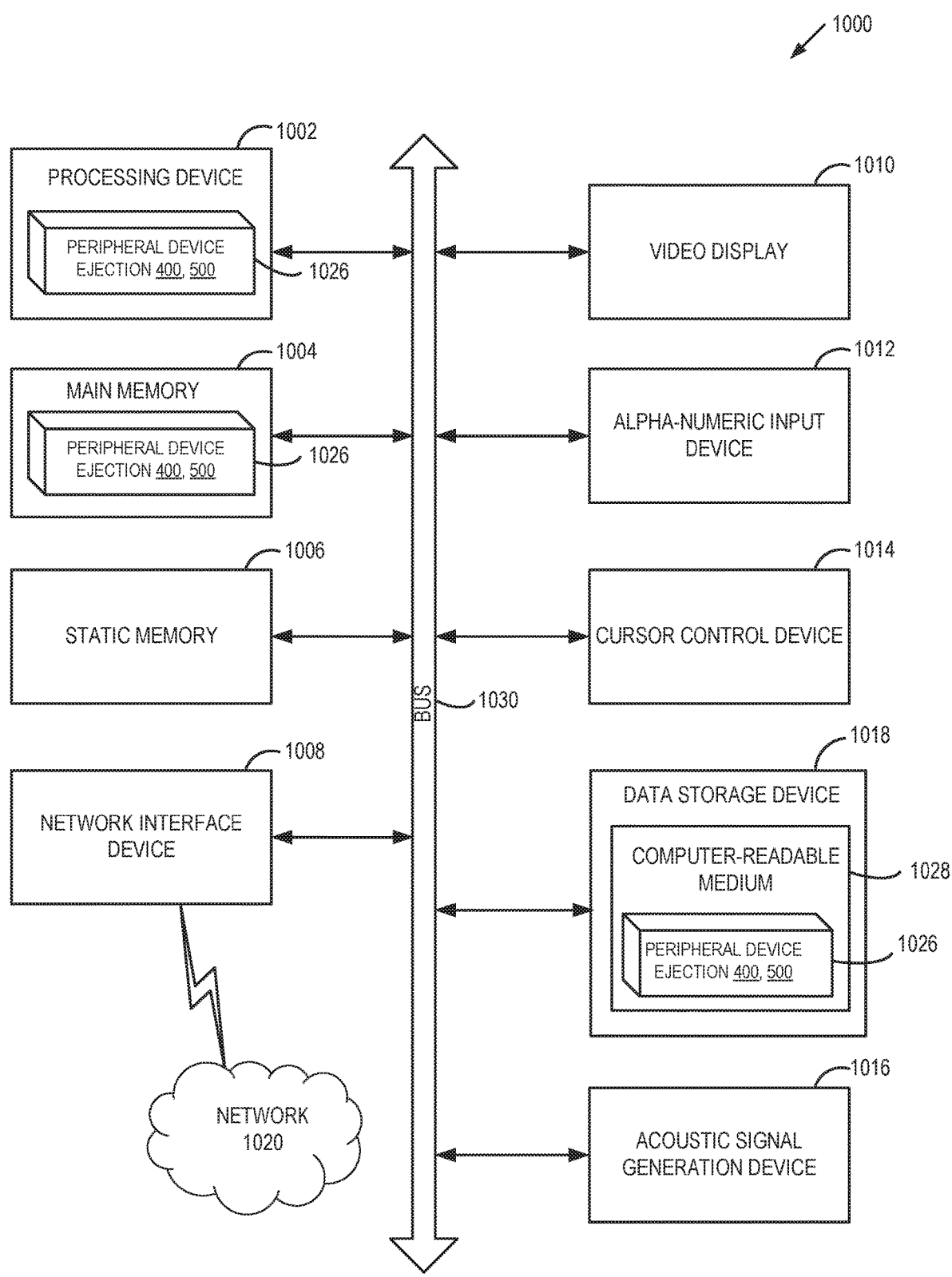
FIG. 6 depicts a block diagram of an example computer system operating in accordance with one or more aspects of the present disclosure.

FIG. 6 schematically illustrates a component diagram of an example computer system 1000 which may perform any one or more of the methods described herein. In various illustrative examples, computer system 1000 may represent example computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing methods 400-500 of single-click ejection of a mountable device associated with a virtual machine.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of methods 400-500 of single-click ejection of a mountable device associated with a virtual machine.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 6 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
receiving, by a virtual machine manager (VMM) of a host computer system, from a guest agent running on a virtual machine managed by the VMM, a notification of a device unmounting operation performed by the virtual machine with respect to a peripheral device;
disassociating from the virtual machine a physical device corresponding to the virtual peripheral device; and
causing a host operating system of the host computer system to unmount the peripheral device.

2. The method of claim 1, further comprising:
registering the guest agent on the virtual machine for device status notifications initiated by a guest operating system (OS) of the virtual machine.

3. The method of claim 1, further comprising:
receiving, by the guest agent, a device removal request from a guest operating system of the virtual machine, the device removal request identifying the peripheral device unmounted by the virtual machine.

4. The method of claim 1, wherein causing the host operating system to unmount the peripheral device further comprises executing, by the VMM, an application programming interface (API) call to the host operating system.

5. The method of claim 1, further comprising:
causing the host operating system to eject the peripheral device.

6. The method of claim 1, wherein the guest agent is provided by one of: a software module running in a user space of a guest operating system of the virtual machine or a software module running in a kernel space of the guest operating system of the virtual machine.

7. The method of claim 1, wherein the peripheral device is provided by one of: a flash memory card, a compact disk, a hard disk drive (HDD) or a solid state drive (SSD).

8. The method of claim 1, wherein the notification comprises a device identifier of the peripheral device and a status identifier of a status of the peripheral device.

9. A host computer system, comprising:
a memory; and
a processor coupled to the memory, wherein the processor is configured to:
receive, by a virtual machine manager (VMM), from a guest agent running on a virtual machine managed by the VMM, a notification of a device unmounting operation performed by the virtual machine with respect to a peripheral device;
disassociate from the virtual machine a physical device corresponding to the virtual peripheral device; and
cause a host operating system of the host computer system to unmount the peripheral device.

10. The host computer system of claim 9, wherein the processor is further configured to:
register the guest agent on the virtual machine for device status notifications initiated by a guest operating system of the virtual machine.

11. The host computer system of claim 9, wherein the processor is further configured to:
receive, by the guest agent, a device removal request from a guest operating system of the virtual machine, the device removal request identifying the peripheral device unmounted by the virtual machine.

12. The host computer system of claim 9, wherein causing the host operating system to unmount the peripheral device further comprises executing, by the VMM, an application programming interface (API) call to the host operating system.

13. The host computer system of claim 9, wherein the notification comprises a device identifier of the peripheral device and a status identifier of a status of the peripheral device.

14. The host computer system of claim 9, wherein the peripheral device is provided by one of: a flash memory card, a compact disk, a hard disk drive (HDD) or a solid state drive (SSD).

15. A non-transitory computer-readable storage medium comprising executable instructions that, when executed by a host computer system, cause the host computer system to:
receive, by a virtual machine manager (VMM) running on the host computer system, from a guest agent running on a virtual machine managed by the VMM, a notification of a device unmounting operation performed by the virtual machine with respect to a peripheral device;
disassociate from the virtual machine a physical device corresponding to the virtual peripheral device; and
cause a host operating system of the host computer system to unmount the peripheral device.

16. The non-transitory computer-readable storage medium of claim 15, further comprising executable instructions that cause the host computer system to:
register the guest agent on the virtual machine for device status notifications initiated by a guest operating system of the virtual machine.

17. The non-transitory computer-readable storage medium of claim 15, further comprising executable instructions that cause the host computer system to:
receive, by the guest agent, a device removal request from a guest operating system of the virtual machine, the device removal request identifying the peripheral device unmounted by the virtual machine.

18. The non-transitory computer-readable storage medium of claim 15, wherein causing the host operating system to unmount the peripheral device further comprises executing, by the VMM, an application programming interface (API) call to the host operating system.

19. The non-transitory computer-readable storage medium of claim 15, wherein the guest agent is provided by one of: a software module running in a user space of a guest operating system of the virtual machine or a software module running in a kernel space of the guest operating system.

20. The non-transitory computer-readable storage medium of claim 15, wherein the peripheral device is provided by one of: a flash memory card, a compact disk, a hard disk drive (HDD) or a solid state drive (SSD).

* * * * *